(12) United States Patent
Ali et al.

(10) Patent No.: US 8,517,100 B2
(45) Date of Patent: Aug. 27, 2013

(54) COMPOSITIONS AND METHODS FOR CLEANING A WELLBORE PRIOR TO CEMENTING

(75) Inventors: Syed A. Ali, Sugar Land, TX (US); Gunnar Debruijn, Calgary (CA); Laurent Delabroy, Houston, TX (US); Emmanuel Therond, Paris (FR); Bruno Drochon, Cambridge (GB); Cecilia Nguyen, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 360 days.

(21) Appl. No.: 12/778,234

(22) Filed: May 12, 2010

(65) Prior Publication Data

US 2011/0278004 A1    Nov. 17, 2011

(51) Int. Cl.
*E21B 33/13* (2006.01)
(52) U.S. Cl.
USPC .......................... 166/293; 166/294; 166/300
(58) Field of Classification Search
USPC .................................. 166/292, 293, 294, 295
See application file for complete search history.

(56) References Cited

U.S. PATENT DOCUMENTS

| | | | |
|---|---|---|---|
| 6,534,669 B2 | 2/1895 | Parker | |
| 5,034,140 A * | 7/1991 | Gardner et al. | 507/244 |
| 5,551,516 A | 9/1996 | Norman et al. | |
| 5,904,208 A * | 5/1999 | Ray et al. | 166/312 |
| 5,964,295 A | 10/1999 | Brown et al. | |
| 5,979,555 A | 11/1999 | Gadberry et al. | |
| 5,979,557 A | 11/1999 | Card et al. | |
| 6,140,277 A | 10/2000 | Tibbles et al. | |
| 6,258,859 B1 | 7/2001 | Dahayanake et al. | |
| 6,509,301 B1 | 1/2003 | Vollmer | |
| 7,318,477 B2 | 1/2008 | Hou | |
| 7,380,606 B2 | 6/2008 | Pursley et al. | |
| 7,392,844 B2 * | 7/2008 | Berry et al. | 166/291 |
| 7,481,273 B2 * | 1/2009 | Javora et al. | 166/300 |
| 7,544,639 B2 | 6/2009 | Pursley et al. | |
| 2002/0132740 A1 * | 9/2002 | Von Krosigk et al. | 507/200 |
| 2006/0258541 A1 * | 11/2006 | Crews | 507/203 |
| 2008/0274918 A1 | 11/2008 | Quintero et al. | |
| 2008/0287324 A1 | 11/2008 | Pursley et al. | |
| 2009/0008091 A1 | 1/2009 | Quintero et al. | |
| 2009/0221456 A1 | 9/2009 | Harrison et al. | |

OTHER PUBLICATIONS

Smith G., Kumar P. and Nguyen D., "Formulating Cleaning Products with Microemulsion", paper No. 164, Proceedings 6th World Congress CESIO, Berlin, Germany, Jun. 21-23, 2004.
Van Zanten R., Lawrence B., and Henzler S., "Using Surfactant Nanotechnology to Engineer Displacement Packages for Cementing Operations", paper IADC/SPE127885, 2010.
S. Ezraha, A. Aserin and N. Garti, "Chapter 7: Aggregation Behavior in one-Phase (Winsor IV) Microemulsion Systems", in P. Kumar and K. L. Mittal, ed., Handbook of Microemulsion Science and Technology, Marcel Dekker, Inc., New York, 1999, pp. 185-246.

* cited by examiner

*Primary Examiner* — Zakiya W Bates
*Assistant Examiner* — Silvana Runyan
(74) *Attorney, Agent, or Firm* — Michael Dae

(57) ABSTRACT

Single-phase microemulsions, comprising a solvent, a surfactant blend and a carrier fluid, are effective spacer fluids for use during cementing operations. The solvent may be selected from the group consisting of monoterpenes, diterpenes, and alkyl or aryl esters of short-chain alcohols. The surfactant blend comprises a water-wetting surfactant or nonionic surfactant, a co-surfactant and an oil-solubilizing surfactant. The carrier fluid is aqueous. The solvent and surfactant blend are combined with the carrier fluid to produce the well-treatment microemulsion.

12 Claims, 2 Drawing Sheets

COMPOSITIONS AND METHODS FOR CLEANING A WELLBORE PRIOR TO CEMENTING

This invention relates generally to compositions and methods for treating a subterranean well prior to cementing. More specifically, the present invention relates to compositions and methods for cleaning casing and wellbore surfaces with a microemulsion.

Some statements may merely provide background information related to the present disclosure and may not constitute prior art.

The use of oil or synthetic-based drilling fluid (SBM/OBM) is widespread in many areas for a variety of reasons, including excellent shale inhibition, high rates of penetration and high lubricity. Oil- or synthetic-based drilling fluids generally comprise invert emulsion fluids, where the continuous or external phase is predominantly organic (e.g., mineral oil or synthetic oil), and the inverse or internal phase is usually aqueous (e.g., brines). The stability of invert emulsions is generally maintained by one or more additives present in the fluid, such as emulsifiers, emulsion stabilizing agents, and oil-wetting agents.

When drilling is performed with SBM/OBM fluids, the wellbore becomes oil-wet. Prior to cementing, the casing also becomes oil-wet while being run into the hole. This condition commonly results in poor bonding between the set cement and the casing and wellbore surfaces. Poor cement bonding may compromise the hydraulic seal in the annulus, potentially resulting in fluid communication between subterranean zones Therefore, to ensure successful cementing, at least two conditions are necessary: (1) the SBM/OBM is effectively removed from the borehole; and (2) the wellbore-wall and casing surfaces are water-wet. Failure to satisfy Condition 1 may cause contamination of the cement slurry, and the cement performance may suffer. Failure to satisfy Condition 2 may lead to poor bonding between the cement and the borehole-wall and casing surfaces.

Despite efforts to prepare the borehole properly prior to cementing, Cement Bond Logs (CBL) commonly reveal poor or no bonding, or poor quality cement behind casing. Current solutions to achieve mud removal and water wetting include pumping fluids that separate the cement slurry from the drilling fluid. The fluid may be a single-stage, viscous, water-base spacer that contains surfactants with strong water-wetting tendencies. Or, a two-stage spacer system may be pumped that comprises base oil, solvents, or water-base chemical washes with surfactants, in combination with a viscous water-base spacer that contains water-wetting surfactants.

Proposals have been made in the art to use microemulsions for borehole preparation prior to cementing. See, for example, US patents or applications U.S. Pat. No. 5,904,208; U.S. Pat. No. 7,380,606; U.S. Pat. No. 6,534,449; U.S. Pat. No. 7,392,844; U.S. Pat. No. 7,318,477; U.S. Pat. No. 7,481,273; U.S. Pat. No. 7,544,639; US2009/0008091; US2009/0221456; US 2008/0274918; and US 2008/0287324. Pertinent microemulsions literature references include the following publications. Smith, G., Kumar, P. and Nguyen, D.: "*Formulating Cleaning Products with Microemulsion*", paper number 164, Proceedings 6th World Congress CESIO, Berlin, Germany, Jun. 21-23, 2004; and Van Zanten, R., Lawrence, B., and Henzler, S.: "*Using Surfactant Nanotechnology to Engineer Displacement Packages for Cementing Operations*", paper IADC/SPE 127885, 2010.

SUMMARY OF THE INVENTION

Despite all these valuable contributions and the various spacer fluids in commercial practice today, there is still a need for an effective single spacer for optimizing the displacement of SBM/OBM, thus allowing superior bonding of cement in the annular space between casing and the formation face.

The present invention fulfills this need by providing compositions and methods for using a microemulsion to clean a subterranean well borehole and casing prior to cementing. The microemulsion is formed by combining a blend of sulfonate-base surfactants, an alcohol ethoxylate surfactant, a solvent, a co-solvent, an oil-solubilizing surfactant, and water or brine. These additives are mixed together to form a single-phase, optically-clear, thermodynamically-stable microemulsion.

Another aspect of the invention is a method for removing oil-base or synthetic-base drilling fluid from a wellbore, a subterranean formation or both. The method comprises the introduction of a preblended microemulsion into the wellbore, thereby providing clean and water-wet casing and borehole surfaces. The clean surface will provide superior bonding of cement to the cleaned surfaces.

Yet another aspect of the invention is a method for cementing a subterranean well having a wellbore. The wellbore has a casing suspended therein and contains, or has been treated with, an oil-base or synthetic-base drilling fluid. The method comprises the steps of providing a single-phase microemulsion spacer fluid, pumping the spacer into the region between the casing and the wellbore, providing a cement slurry, and pumping the cement slurry into the region between the casing a the wellbore.

DETAILED DESCRIPTION OF SOME EMBODIMENTS

Figure 1:
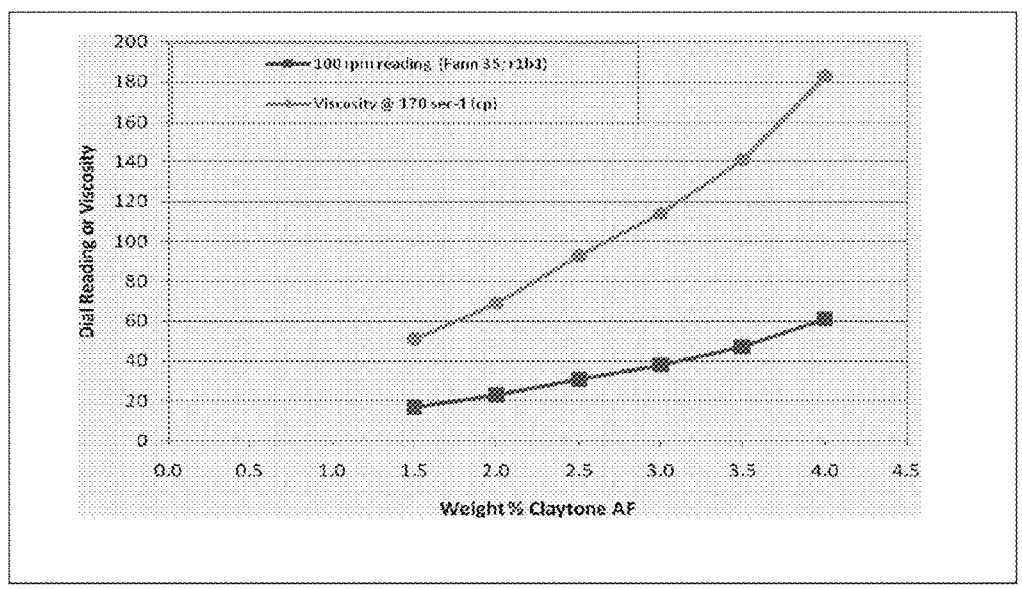
FIG. 1 shows the effects of Claytone AF on base fluid viscosity at 65.5° C. (150° F.).

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

The present invention relates to a microemulsion-based spacer that is introduced into the wellbore to displace synthetic-base and/or oil-base drilling fluid, and provide clean and water-wet casing and borehole surfaces prior to cementing. The microemulsion is formed by combining a blend of sulfonate-base surfactants, an alcohol ethoxylate surfactant, a solvent, a co-solvent, an oil-solubilizing surfactant, and water or brine.

Microemulsions are macroscopically homogeneous mixture of oil, water and surfactant. They form upon simple mixing of the components, and do not require the high-shear conditions generally required for creating ordinary emulsions. Microemulsions are thermodynamically, not kinetically, stabilized, and may consist of one, two or three phases. They may consist of oil dispersed in water (O/W) or water dispersed in oil (W/O) emulsions. Microemulsions are generally described as Winsor Type I, II, III or IV emulsions. A system or formulation is defined as: Winsor I when it contains a microemulsion in equilibrium with an excess oil phase; Winsor II when it contains a microemulsion in equilibrium with excess water; Winsor III when it contains a middle phase microemulsion in equilibrium with excess water and excess oil; and Winsor IV when it contains a single-phase microemulsion with no excess oil or excess water. More information about microemulsions and especially about Winsor IV can be found in S. Ezrahi, A. Aserin and N. Garti, "*Chapter 7: Aggregation Behavior in One-Phase (Winsor IV) Microemulsion Systems*", in P. Kumar and K. L. Mittal, ed., *Handbook of Microemulsion Science and Technology*, Marcel Dekker, Inc., New York, 1999, pp. 185-246.

In a preferred embodiment, the present invention aims at a single-phase Winsor IV type microemulsion that is formed prior to pumping in the wellbore. Preferably, the microemulsion comprises at least a solvent, a surfactant and an aqueous fluid. More preferably, a co-solvent is also present. Even more preferably, the surfactant portion is composed of at least a water-wetting surfactant, a cleaning co-surfactant and an oil-solubilizing surfactant.

The solvent is preferably selected from the group of selected from the group of glycol ethers, such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monoethyl ether, diethylene glycol monoethyl ether and diethylene glycol mono-n-butyl ethyl. In a particularly preferred embodiment, the solvent is ethylene glycol monobutyl ether (EGMBE). The solvent is preferably present in an amount of from about 5 to about 45%, more preferably from about 5 to about 40% by weight of the microemulsion.

In a presently preferred embodiment, the co-solvent is selected from the group of aliphatic solvents such as hexane, diesel, gasoline, kerosene and deodorized kerosene. In a particularly preferred embodiment, the co-solvent is kerosene. The co-solvent is preferably present in an amount of from about 5 to about 45%, more preferably from about 5 to about 40% by weight of the microemulsion.

In a presently preferred embodiment, preferred water-wetting surfactants include linear primary $C_{11}$ to $C_{15}$ alcohol ethoxylates, including those that have about 3 to about 10 moles of ethoxylation. Examples include (but are not limited to) linear $C_{12-15}$ alcohol with 2.8 moles of ethylene oxide, linear $C_{12-15}$ alcohol with 2.8 moles of ethylene oxide, linear $C_{12-15}$ alcohol with 7.3 moles of ethylene oxide, linear $C_{12-15}$ alcohol with 8.9 moles of ethylene oxide, linear $C_{14-15}$ alcohol with 12.9 moles of ethylene oxide, linear $C_{1-15}$ alcohol with 2.23 moles of ethylene oxide, linear $C_{9-11}$ alcohol with 2.7 moles of ethylene oxide, linear $C_{9-11}$ alcohol with 6 moles of ethylene oxide and linear $C_{9-11}$ alcohol with 8.3 moles of ethylene oxide. The preferred water wetting surfactant is a linear $C_{9-11}$ alcohol with 6 moles of moles of ethylene oxide. The water wetting surfactant is preferably present in an amount from about 1 to about 5% by weight of the microemulsion.

In a presently preferred embodiment, the cleaning co-surfactant is selected from the salts of n-alkylbenzenesulfonic acid, such as ammonium dodecylbenzenesulfonate, calcium dodecylbenzenesulfonate, magnesium isododecylbenzenesulfonate, potassium dodecylbenzenesulfonate, sodium decylbenzenesulfonate, sodium dodecylbenzenesulfonate (linear), sodium dodecylbenzenesulfonate (branched) and sodium tridecylbenzenesulfonate. In a particularly preferred embodiment, the co-surfactant is a blend of linear sodium dodecylbenzenesulfonate and branched sodium dodecylbenzenesulfonate. The linear and branched blend ratio is preferably about 1.5:1. The cleaning co-surfactant blend is preferably present in an amount of from about 1 to about 25%, more preferably from about 4 to about 25%, even more preferably from about 10 to about 20% by weight of the microemulsion.

In a presently preferred embodiment, the emulsifying surfactant is selected from the group of polysorbates, such as polyoxyethylene (20) sorbitan monolaurate, polyoxyethylene (20) sorbitan monoplamitate, polyoxyethylene (20) sorbitan monooleate and polyoxyethylene (20) sorbitan monostearate. The preferred oil-solubilizing surfactant is polyoxyethylene (20) sorbitan monooleate. The oil-solubilizing surfactant is preferably present in an amount of from about 1 to about 10%, more preferably from about 1 to about 5% by weight of the microemulsion.

The microemulsion according to the present invention also comprises an aqueous fluid, preferably water or brine in an amount of from about 5 to 30%, preferably from about 5 to about 25% by weight of the microemulsion.

A preferred formulation for the inventive microemulsions is as follows.
  5%-30% by weight co-solvent;
  5%-30% by weight solvent;
  1%-5% by weight water-wetting surfactant;
  5%-25% by weight cleaning co-surfactant blend;
  1%-5% by weight emulsifying surfactant;
  5%-25% water It is also within the scope of the present invention to use microemulsions containing a non-ionic surfactant as an alternative to the water-wetting surfactant mixture described herein. Such a non-ionic surfactant may include linear primary $C_{11}$-$C_{15}$ alcohol ethoxylates, including those which have from about 3 to about 10 moles of ethoxylation. Examples include (but are not limited to) linear $C_{11}$ alcohol with 3 moles (average) of ethylene oxide, linear $C_{11}$ alcohol with 5 moles (average) of ethylene oxide, linear $C_{11}$ alcohol with 7 moles (average) of ethylene oxide, linear $C_{11}$ alcohol with 9 moles (average) of ethylene oxide, linear $C_{12-13}$ alcohol with 1 mole (average) of ethylene oxide, linear $C_{12-13}$ alcohol with 3 moles (average) of ethylene oxide, linear $C_{12-13}$ alcohol with 5 moles (average) of ethylene oxide, linear $C_{12-13}$ alcohol with 6.6 moles (average) of ethylene oxide, linear $C_{12-15}$ alcohol with 11.9 moles (average) of ethylene oxide, linear $C_{12-15}$ alcohol with 2.8 moles (average) of ethylene oxide, linear $C_{12-15}$ alcohol with 7.3 moles (average) of ethylene oxide, linear $C_{12-15}$ alcohol with 8.9 moles (average) of ethylene oxide; linear $C_{14-15}$ alcohol with 12.9 moles (average) of ethylene oxide, linear $C_{14-15}$ alcohol with 2.23 moles (average) of ethylene oxide, linear $C_{14-15}$ alcohol with 7 moles (average) of ethylene oxide, linear $C_{9-11}$ alcohol with 2.7 moles (average) of ethylene oxide, linear $C_{9-11}$ alcohol with 6 moles (average) of ethylene oxide and linear $C_{9-11}$ alcohol with 8.3 moles (average) of ethylene oxide. The nonionic surfactant is preferably present in an amount of from about 1 to about 15% by weight of the microemulsion.

If appropriate, the microemulsion spacer of the present invention may also be viscosified. Non-limiting examples of viscosifying agents suitable for use herein include aluminum phosphate ester, alkyl quaternary ammonium bentonite, alkyl quaternary ammonium montmorillonite, xanthan gum, diutan gum, welan gum, carboxymethylcellulose, hydroxyethylcellulose, and hydroxypropylcellulose. The preferred viscosifying agent is alkyl quaternary ammonium bentonite. The density of the viscosified microemulsion may also be adjusted by, for example, adding a suitable weighting agent. Suitable weighting agents include (but are not limited to) barite, calcium carbonate, hematite, ilmenite, magnesium tetraoxide and silica. It has to be noted that weighting agents such as coarse barite, coarse calcium carbonate or coarse hematite may also be used as weighting agent in the present context.

In a further embodiment of the present invention, the viscosity of the microemulsion may be increased with an organophilic clay such as CLAYTONE (available from Southern Clay Products, Inc.; Gonzalez, Tex., USA).

In a further embodiment of the invention, a trimer acid based rheology modifier such as RHEFLAT (available from M-I SWACO, Houston, Tex., USA) may be added to the viscosified microemulsion to achieve a flat rheology profile. Without wishing to be bound by any theory, this compound is believed to enhance low-end viscosity and yield point by interacting with fine solids such as organophillic clay and weighting solids such as calcium carbonate, barite, and hematite. The rheology modifier is preferably present in an amount of from about 1 to about 5% by weight of the microemulsion.

In other embodiments of the invention, the surfactant is a viscoelastic surfactant (VES) fluid system. VES fluid systems are fluids viscosified by a viscoelastic surfactant. Additional materials may be present, including (but not limited to) salts, co-surfactants, rheological-property enhancers, stabilizers and shear-recovery enhancers that improve or modify the performance of the viscoelastic surfactant.

Useful VES's include cationic, anionic, nonionic, mixed, zwitterionic and amphoteric surfactants, especially betaine zwitterionic viscoelastic surfactant fluid systems or amidoamine oxide viscoelastic surfactant fluid systems. Examples of suitable VES systems include those described in U.S. Pat. Nos. 5,551,516; 5,964,295; 5,979,555; 5,979,557; 6,140,277; 6,258,859 and 6,509,301, which are all hereby incorporated by reference. The system of the invention is also useful when used with several types of zwitterionic surfactants. In general, suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-,$$

in which R is an alkyl group that contains from about 14 to about 23 carbon atoms. The alkyl group may be branched or straight chained, and may be saturated or unsaturated. The suffixes a, b, a', and b' are each from 0 to 10, and m and m' are each from 0 to 13; in addition, a and b are each 1 or 2 if m is not 0, and (a+b) is from 2 to about 10 if m is 0. Furthermore, a' and b' are each 1 or 2 when m' is not 0, and (a'+b') is from 1 to about 5 if m is 0; (m+m') is from 0 to about 14, and the O in either or both $CH_2CH_2O$ groups or chains, if present, may be located on the end towards or away from the quaternary nitrogen. Preferred surfactants are betaines.

The well-treatment microemulsions may also be used to deliver acids during acidizing operations. Commonly used acids include hydrochloric, acetic, formic, and hydrochloric-hydrofluoric acid blends. In a presently preferred embodiment, the selected solvent-surfactant blend (dilute or concentrate) is combined with an acidified carrier fluid to prepare a microemulsion suitable for acidizing operations. Preferably, the microemulsion includes about 0.2%-5% by volume of the solvent-surfactant blend, and about 3%-28% by volume of acid. In a particularly preferred embodiment, the microemulsion includes about 0.2%-5% of the solvent-surfactant blend and about 15% by volume of hydrochloric acid. The concentration of the well-treatment microemulsion in gelled fluids lowers the friction created by contact with conduits, thereby facilitating the injection and withdrawal of the well-treatment microemulsion.

In a further aspect of the invention relates to a method for removing oil-base or synthetic-base drilling fluid from a wellbore, a subterranean formation or both. The method comprises the introduction of the disclosed preblended microemulsions into the wellbore, thereby providing clean and water-wet casing and borehole surfaces. The clean surface will provide superior bonding of cement to the cleaned surfaces. The microemulsions according to the present invention may be pumped ahead of a conventional water-base spacer or after a conventional water-base spacer. Those skilled in the art will understand that conventional water-base spacers are not microemulsions, and are exemplified by MUDPUSH™ spacers, available from Schlumberger. The conventional water-base spacer may be viscosified and weighted, or viscosified and unweighted.

In a preferred embodiment, the density of the microemulsion is equal to or greater than the density of the SBM/OBM. In another preferred embodiment, the density of the microemulsion is equal to or less than the density of the cement slurry.

In yet a further aspect of the invention relates to a method for cementing a subterranean well having a borehole. The wellbore has a casing suspended therein and contains, or has been treated with, an oil-base or synthetic-base drilling fluid. The method comprises the steps of providing the disclosed single-phase microemulsion spacer fluid, pumping the spacer into the region between the casing and the wellbore, providing a cement slurry, and pumping the cement slurry into the region between the casing a the wellbore. The spacer fluid removes the drilling fluid from the region between the casing and the wellbore, thereby providing clean and water-wet casing and borehole surfaces.

It is also within the scope of the invention to provide a method where the present invention is pumped behind or ahead of conventional spacer or scavanger or both. One may also envisage pumping the present microemulsion between two or more spacer and/or scavanger. This may allow using a lower amount of microemulsion but still optimizing the cleaning effect.

EXAMPLES

The following examples serve to illustrate the invention.

Experimental Methods

Two synthetic-base drilling fluids were utilized in the evaluation. RHELIANT™ (14.7 lb/gal; 1.76 kg/L) and ACCOLADE™ (12.4 lb/gal; 1.49 kg/L) drilling-fluid samples were obtained from location rig sites. RHELIANT drilling fluid is available from M-I SWACO, Houston, Tex., USA. ACCOLADE drilling fluid is available from Baroid Fluid Services, Houston, Tex., USA. With the exception of compressive strength, tests were performed at a temperature of 150° F. (65.5° C.). Compressive strength was evaluated at a bottomhole static temperature of 201° F. (93.9° C.).

In the following examples, the following compounds were used unless otherwise specified: the cement was Class H cement from LaFarge (Joppa), the anti-settling agent was a wellan gum available from Schlumberger, the antifoam agent was propylene glycol, the retarder was UNISET™-LT available from Schlumberger, the fluid-loss agent was UNIFLAC™ available from Schlumberger, the dispersant was sodium polynaphtalene sulfonate and the gelling agent was Claytone AF (available from Southern Clay Products, Inc.; Gonzalez, Tex., USA).

A microemulsion was formulated for use as a weighted spacer, designed for removal of synthetic oil-base-mud ahead of primary cementing operations. The spacer was composed of a mixture of solvents, surfactants and water. The resulting microemulsion was a translucent fluid with the solvent portion as the external phase. The microemulsion was evaluated for application as a weighted spacer. This microemulsion could also have been used as an unweighted spacer The microemulsion composition is shown in Table 1.

TABLE 1

Composition of the microemulsion:

| Compounds | Concentration (wt %) |
|---|---|
| Kerosene | 35.71 |
| Ethylene Glycol Monobutyl Ether | 35.71 |
| Sorbitan Monooleate 20 | 2.26 |
| Potassium Chloride Solution (4%) | 7.52 |
| Sodium Dodecylbenzene Sulfonate, (40% Linear) | 5.64 |
| Sodium Dodecylbenzene Sulfonate, (30% Branched) | 9.40 |
| Nonionic Alcohol Ethoxylate | 3.76 |
| Total | 100.0 |

The cement slurry and spacer designs are provided in Tables 2-5. Cement, mud and spacer-fluid preparations were heated to a test temperature of 150° F. (65.5° C.) using a unpressurized atmospheric consistometer, and conditioned for 30 minutes prior to evaluation.

TABLE 2

Cement Slurry Design at 16.4 lbm/gal (1.97 kg/L)

| Additive | Concentration |
|---|---|
| Class H Cement | — |
| Anti-settling agent | 0.02% by weight of cement (BWOC) |
| Antifoam | 0.02 gal/sack (1.78 mL/kg) |
| Retarder | 0.05 gal/sack (4.44 mL/kg) |
| Fluid loss | 0.25 gal/sack (22.2 mL/kg) |
| Dispersant | 0.05 gal/sack (4.44 mL/kg) |
| Fresh Water | 4.07 gal/sack (367 mL/kg) |

TABLE 3

Microemulsion-based Spacer at 14.7 lbm/gal (1.76 kg/L)

| Additive | Weight (g) |
|---|---|
| Microemulsion Base fluid | 248.6 |
| Gelling Agent | 6.25 |
| Barite | 328.6 |

TABLE 4

Microemulsion-based Spacer at 15.5 lbm/gal (1.86 kg/L)

| Additive | Weight (g) |
|---|---|
| Microemulsion Base fluid | 231.8 |
| Gelling Agent | 5.8 |
| Barite | 409.0 |

TABLE 5

Microemulsion-based Spacer at 15.1 lbm/gal (1.81 kg/L)

| Additive | Weight (g) |
|---|---|
| Microemulsion Base fluid | 281.6 |
| Gelling Agent | 5.8 |
| Barite | 459.8 |

A gelling agent, alkyl quaternary ammonium bentonite (Claystone AF), was used to increase the viscosity of the base fluid prior to the addition of barite. The viscosity may be optimized by modifying the concentration of Claytone AF and/or the final weighted-spacer density. The effects of Claytone AF gelling agent on the base fluid viscosity are shown in FIG. 1

Barite was absent from the spacer formulations during the Casing Water Wetting Tests, described later.

Wetting and Grid Tests.

The spacer was prepared as follows. The desired concentration of gelling agent was mixed with the microemulsion base fluid for 5 minutes at 4,000 rpm in a Waring blender. The gelled fluid was then transferred to a suitable container and conditioned for 30 minutes using an impeller type mixer. The speed of the mixer was increased until a vortex was observed. After this initial conditioning period, the required amount of barite was added to the impeller vortex in order to bring the spacer to the desired weight. The mixer speed was adjusted to maintain a vortex. The resulting mixture was conditioned for 30 minutes.

Casing Water Wetting Test (CWWT)

The Casing Water Wetting Test was employed to determine the mud-removal effectiveness of the surfactant. The test was performed with 4-in. by 1-in. (10.2-cm by 2.54-cm) casing coupons. The procedure is as follows.

The spacer was preheated to 150° F. (65.5° C.) for 30 minutes, and transferred to a cup from a Chan 35 rotational viscometer (available from Chandler Engineering, Broken Arrow, Okla., USA).

A casing coupon was statically submerged for 10 minutes in 11.3-lb/gal (1.35-kg/L) synthetic oil-base mud, also preheated to 150° F. (65.5° C.).

The coupon was removed from the oil-base mud, and the convex face of the coupon was cleaned with paper.

The coupon was transferred to the viscometer cup containing the spacer. With the mud-covered face facing the inside of the cup, the coupon was fixed inside the cup such that the lower ⅔ was submerged in the spacer.

The viscometer rotor, without the bob, was lowered into the spacer fluid in the cup. The rotor was then operated at 100 RPM for 30 minutes.

The coupon was removed, and the qualitative evaluation of water wetting proceeded. A piece of Teflon tape (as it closely represents an oil-wet surface) was placed on the coupon. A 20-microliter drop of distilled water was placed on the surfaces of the Teflon tape, the untreated oil-wet area of coupon, and the ⅔ of the coupon that had been submerged in the spacer. The diameters of the droplets were measured.

The diameter ratio between the droplet on Teflon (D1) and that on the spacer-treated surface (D2) was calculated. Then, the guideline shown in Table 6 was used to determine the contact angle and the water wettability.

TABLE 6

Guideline for the Contact Angle and Water Wettability

| Diameter ratio, D2/D1 | Contact Angle (degrees) | Water Wettability |
|---|---|---|
| 1 | 150 | Poor Wetting > 90° |
| 1.3 | 90 | 90° < Fair Wetting > 30° |
| 2.1 | 30 | Good Wetting < 30° |
| 2.9 | 15 | |
| 6.5 | 0 | |

Grid Test

The grid test measures the capability of a surfactant to remove a gelled layer of mud with gentle erosion. A 30-mesh metallic grid was placed over a closed rotor on a Chan 35 viscometer. The grid and rotor assembly were weighed and recorded as $W_1$. The grid and rotor assembly were then covered for 10 minutes with 11.3-lb/gal (1.35 kg/L) synthetic oil-based mud, preheated to 150° F. (65.5° C.). They were removed, weighed and recorded as $W_2$. The grid and rotor assembly were reattached to the viscometer and submerged in spacer fluid, also preheated to 150° F. (65.5° C.), and rotated at 100 RPM for 30 minutes. They were then removed, weighed and recorded as $W_3$. The mud removal percentage (%) was calculated by the following equation.

$$\text{Mud Removal (\%)} = \left[1 - \frac{(W_3 - W_1)}{(W_2 - W_1)}\right] \times 100$$

Compatibility Test

The Compatibility Test was performed in accordance with the procedure given by American Petroleum Institute Publication API RP 10B-2, "Recommended Practice for Testing Well Cements." This document is also available from the International Organization for Standards, published as ISO 10426-2. Rheological measurements were recorded from the mud, cement and spacer fluids individually. Next, rheological measurements performed on mixtures of cement/mud, cement/spacer and mud/spacer. The volumetric proportions of the mixtures were 95/5, 75/25, 50/50, 25/75, and 5/95. Finally, rheological measurements were performed on a 25/50/25 mixture of mud/spacer/cement. Testing was performed with a Chan 35 viscometer. The fluid temperature was 150° F. (65.5° C.). Each fluid was preconditioned in an atmospheric consistometer for 20 minutes at 150° F. (65.5° C.).

Fluid compatibility was assessed by calculating the R-Index Value, R. The calculation is as follows: R=[Highest 100-RPM reading from a mixture−Highest 100-RPM reading from an individual fluid]. The compatibility assessment is given in Table 7.

TABLE 7

Definition of R-Index Value

| | |
|---|---|
| If R < 0 | Fluids are compatible |
| 0 < R < 40 | Fluids are compatible, BUT friction pressures should be verified to avoid fracturing the formation |
| 41 < R < 70 | Fluids are slightly incompatible. Additional testing is required. |
| R > 71 | Definitely Incompatible. An alternative formulation must be found. |

Wettability Test (Reverse Emulsion Test)

The spacer and mud were conditioned at 150° F. (65.5° C.) for 20 minutes in atmospheric consistometers. Then, the spacer was placed in a heated Waring-blender bowl, equipped with a conductivity probe and meter. Sufficient spacer was added to cover the probe and reset the conductivity meter to 3.0 mA. The spacer was removed from the blender bowl, and 250 mL of synthetic oil-based mud (SBM) were placed in the preheated Waring blender, and agitated for 2 minutes at a speed sufficient to observe a visible vortex. The spacer was slowly added to the SBM in 10- to 20-mL increments. The conductivity value of the mixture was observed and recorded after each increment. When the total volume of mud and spacer reached 500 milliters (mL), 250 mL of the SBM-spacer mixture were removed. The remaining 250 mL of SBM-spacer mixture were agitated for 2 minutes at 150° F. (65.5° C.), again at a speed sufficient to observe a vortex. Then, additional spacer was added in 10- to 20 mL increments until the 3.0 mA reading was surpassed.

Thickening-Time and Compressive Strength

Cement thickening-time and compressive-strength evaluations were performed in accordance with the procedures given by American Petroleum Institute Publication API RP 10B-2, "Recommended Practice for Testing Well Cements." This document is also available from the International Organization for Standards, published as ISO 10426-2.

Example 1

Compatibility

The 14.0-lbm/gal (1.68-kg/L) microemulsion-base spacer formulation showed R-values of 15 and 23 with the ACCOLADE mud and cement slurry, respectively. These values indicated that the fluids were compatible, but friction pressures should be checked during job design.

Cement-compatibility tests with the 15.5-lbm/gal (1.89-kg/L) microemulsion-base spacer provided an R-value of 68, indicating a slight incompatibility, and a need for the spacer formulation to be redesigned. The Claytone AF gelling-agent concentration was decreased from 2.5% to 2.1% by weight of the base fluid, and the density was lowered to 15.1 lbm/gal (1.81 kg/m$^3$). The results indicated R-values of 6.5 and 23.5 for the spacer/RHELIANT mud and spacer/cement slurry, respectively, indicating fluid compatibility. This also demonstrated that the gelling agent and density may be modified in order to improve the compatibility of the spacer formulation with both the mud and cement (Table 8).

TABLE 8

R-Index Value Results

| Spacer Formulation | Claytone AF (wt % of base fluid) | Synthetic Drilling Mud | R-value Mud and Spacer | | R-value Spacer and Cement | |
|---|---|---|---|---|---|---|
| 14.0-lbm/gal (1.68-kg/L) Microemulsion-base Spacer | 2.5 | 12.4 lbm/gal (1.49 kg/L) ACCOLADE | 15 | Compatible but check friction pressures | 23 | Compatible but check friction pressures |
| 15.1-lbm/gal (1.81-kg/L)Microemulsion-base Spacer | 2.1 | 14.7 lbm/gal (1.76 kg/L) RHELIANT | 6.5 | Compatible but check friction pressures | 23.5 | Compatible, but check friction pressures |

Example 2

Casing Water-Wetting

Casing water wetting was evaluated, and the results are tabulated in Table 9. The results show that the microemulsion-base spacer formulation provided good water-wetting properties (as demonstrated by contact angles of 15° and 23°) while cleaning both the RHELIANT and ACCOLADE mud from the casing coupons.

TABLE 9

Casing Water Wetting Results

| | Measured Diameter, cm (Using Ruler) | |
|---|---|---|
| | 14 lbm/gal Microemulsion-based spacer w/12.4 lbm/gal (1.49 kg/L) ACCOLADE Mud | 15.1 lbm/gal Microemulsion-based spacer w/14.7 lbm/gal (1.76 kg/L) RHELIANT Mud |
| Water Droplet on Teflon, D1 | 0.4 | 0.4 |
| Droplet on Treated Side, D2 | 0.9 | 1.2 |
| Diameter Ratio, D2/D1 | 2.25 | 3.00 |
| Contact Angle Result | 26° | 15° |
| Water-Wettability Result | Good Wetting | Good Wetting |

Example 3

Grid Cleaning

Figure 2:
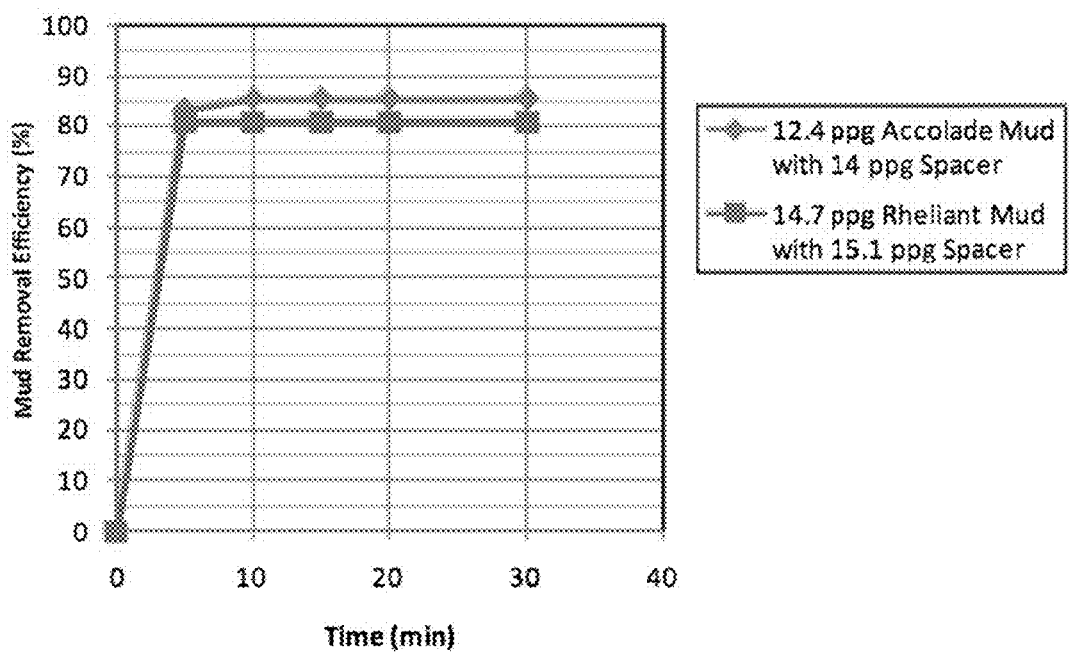
FIG. 2 shows the mud-removal efficiency as measured during grid tests.

The results of the grid tests are provided in Table 10 and FIG. 2 and show mud removal efficiency of 85% with the Accolade mud and 81% for the RHELIANT mud. Most of the mud was removed within about 5 min.

TABLE 10

Grid Test Results

| Spacer Formulation | Synthetic Drilling Mud | Mud Removal, MR (%) |
|---|---|---|
| 14.0-lbm/gal (1.68-kg/L) Microemulsion-base Spacer | 12.4 lbm/gal (1.49 kg/L) ACCOLADE | 85 |
| 15.1-lbm/gal (1.81-kg/L) Microemulsion-base Spacer | 14.7 lbm/gal (1.76 kg/L) RHELIANT | 81 |

Example 4

Wettability (Reverse Emulsion)

A spacer volume of 90% was required to reach the 3-mA set point using the ACCOLADE mud, and a spacer volume of 91% was required to reach the 3-mA set point using the RHELIANT mud sample. According to the method, the span was adjusted to obtain a reading of 3 mA for the neat spacer, and with water-base spacers this value was then used to indicate when the spacer/mud mixture had inverted to a water-wet state. However, the accuracy of the test when using an oil-outside-phase spacer fluid has not been determined. No oil-film residue was observed when the mixer bowl was gently rinsed with a gentle stream of water. Results are provided in the Table 11.

TABLE 11

Wettability-Test Results

| Spacer Formulation | Synthetic Drilling Mud | Spacer Volume, % | Conductivity, mA |
|---|---|---|---|
| 14.0-lbm/gal (1.68-kg/L) Microemulsion-base Spacer | 12.4 lbm/gal (1.49 kg/L) ACCOLADE | 90 | 3.0 |
| 15.1-lbm/gal (1.81-kg/L) Microemulsion-base Spacer | 14.7 lbm/gal (1.76 kg/L) RHELIANT | 91 | 3.0 |

Example 5

Cement-Slurry-Contamination Tests

The cement slurry of Table 1 was contaminated with 10% by volume of the 14.7-lbm/gal (1.76 kg/L) microemulsion spacer fluid, and the effects on the thickening time and compressive strength were measured. The thickening-time tests were performed at 150° F. (65.5° C.) bottomhole circulating temperature (BHCT). The curing temperature for the compressive-strength tests was 201° F. (93.9° C.) bottomhole static temperature (BHST). The results are shown in Table 12.

TABLE 12

Effects of Contamination on Thickening Time and Compressive Strength

| Cement Slurry | Thickening Time (hr:min) | 24-hr Compressive Strength, psi (MPa) | 48-hr Compressive Strength, psi (MPa) |
|---|---|---|---|
| Uncontaminated | 9:00 | — | 3300 (22.8) |
| Contaminated with 10 vol % Spacer Fluid | Not set after 24:00 | 1100 (7.59) | 2000 (13.8) |

These results were expected, because solvents were added to the cement. Oils/organics in general may have a retarding effect on the cement. This incompatibility was later resolved by switching from branched dodecylbenzenefulfonic acid (DDBSA) to linear DDBSA, and replacing the quaternary ammonium surfactant (cationic surfactant) with a linear ethoxylated alcohol (non-ionic surfactant) in the microemulsion recipe.

What is claimed is:

1. A method for cleaning a section of a wellbore prior to a cementing operation, the wellbore having a casing suspended therein, and containing or having been treated with an oil- or synthetic-base drilling fluid, the method comprising the pumping of a single-phase Winsor IV-type microemulsion spacer into the wellbore, the microemulsion comprising:
   5%-45% by weight solvent;
   5%-45% by weight co-solvent;
   1%-5% by weight water-wetting surfactant mixture or non-ionic surfactant;
   1%-25% by weight co-surfactant;
   1%-10% by weight oil-solubilizing surfactant; and
   5%-30% aqueous fluid,
   wherein the co-surfactant in the microemulsion is a blend of linear sodium dodecylbenzenesulfonate and branched sodium dodecylbenzenesulfonate.

2. The method of claim 1, wherein the solvent is ethylene glycol monobutyl ether.

3. The method of claim 1, wherein the co-solvent is an aliphatic solvent.

4. The method of claim 1, wherein the water-wetting surfactant mixture in the microemulsion comprises a linear $C_{9-11}$ alcohol with 6 moles of moles of ethylene oxide.

5. The method of claim 1, wherein the co-surfactant in the microemulsion is a blend of linear sodium dodecylbenzenesulfonate and branched sodium dodecylbenzenesulfonate, wherein the linear-to-branched blend ratio is about 1.5:1.

6. The method of claim 1, wherein the oil-solubilizing surfactant is polyoxyethylene (20) sorbitan monooleate.

7. A method for removing oil-base or synthetic-base drilling fluid from a wellbore or subterranean formation or both, comprising the introduction of a single-phase Winsor IV-type microemulsion into the wellbore, the microemulsion comprising:
   5%-45% by weight solvent;
   5%-45% by weight co-solvent;
   1%-5% by weight water-wetting surfactant mixture or non-ionic surfactant;
   1%-25% by weight co-surfactant;
   1%-10% by weight oil-solubilizing surfactant; and
   5%-30% aqueous fluid,
   wherein the co-surfactant in the microemulsion is a blend of linear sodium dodecylbenzenesulfonate and branched sodium dodecylbenzenesulfonate.

8. The method of claim 7, wherein the viscosity of the microemulsion spacer is adjusted.

9. The method of claim 7, wherein the microemulsion spacer precedes a conventional spacer formulation used in cementing operations.

10. A method for cementing a subterranean well having a wellbore, the wellbore having a casing suspended therein, and containing or having been treated with an oil-base or synthetic-base drilling fluid, comprising the following steps:
    (i) providing a single-phase Winsor IV-type microemulsion spacer;
    (ii) pumping the spacer into the region between the casing and the wellbore;
    (iii) providing a cement slurry; and
    (iv) pumping the cement slurry into the region between the casing and the wellbore,
    wherein the microemulsion comprises:
    5%-45% by weight solvent;
    5%-45% by weight co-solvent;
    1%-5% by weight water-wetting surfactant mixture or non-ionic surfactant;
    1%-25% by weight co-surfactant;
    1%-10% by weight oil-solubilizing surfactant; and
    5%-30% aqueous fluid,
    wherein the co-surfactant in the microemulsion is a blend of linear sodium dodecylbenzenesulfonate and branched sodium dodecylbenzenesulfonate.

11. The method of claim 10, wherein the viscosity of the microemulsion spacer is adjusted.

12. The method of claim 10, wherein the microemulsion spacer precedes a conventional spacer formulation used in cementing operations.

* * * * *